(12) United States Patent
Dominissini et al.

(10) Patent No.: US 6,709,010 B2
(45) Date of Patent: Mar. 23, 2004

(54) REAR TETHER RETRACTOR FOR AN INFLATABLE CUSHION

(75) Inventors: David L. Dominissini, Allen Park, MI (US); Michael K. Hishon, New Baltimore, MI (US)

(73) Assignee: Autoliv ASP, Inc., Ogden, UT (US)

(*) Notice: Subject to any disclaimer, the term of this patent is extended or adjusted under 35 U.S.C. 154(b) by 138 days.

(21) Appl. No.: 10/010,048

(22) Filed: Nov. 9, 2001

(65) Prior Publication Data

US 2003/0090091 A1 May 15, 2003

(51) Int. Cl.$^7$ ............................................... B60R 21/22
(52) U.S. Cl. ................................... 280/730.2; 880/743.2
(58) Field of Search ........................... 280/730.2, 733, 280/743.2

(56) References Cited

U.S. PATENT DOCUMENTS

| | | | |
|---|---|---|---|
| 5,605,346 A | 2/1997 | Cheung | |
| 6,073,961 A | 6/2000 | Bailey | |
| 6,095,551 A * | 8/2000 | O'Docherty | 280/730.2 |
| 6,155,597 A * | 12/2000 | Bowers et al. | 280/730.2 |
| 6,168,194 B1 * | 1/2001 | Cuevas et al. | 280/730.2 |
| 6,176,515 B1 | 1/2001 | Wallner | |
| 6,189,928 B1 | 2/2001 | Sommer | |
| 6,237,943 B1 * | 5/2001 | Brown et al. | 280/730.2 |
| 6,340,172 B1 * | 1/2002 | Ohlert et al. | 280/730.2 |
| 6,361,068 B1 * | 3/2002 | Stein et al. | 280/730.2 |
| 6,375,214 B1 * | 4/2002 | Nishikaji | 280/728.2 |
| 6,378,897 B1 * | 4/2002 | Butters et al. | 280/730.2 |
| 6,412,810 B1 7/2002 | Wipasuramonton et al. | | 280/730.2 |
| 6,431,588 B1 * | 8/2002 | Bayley et al. | 280/730.2 |
| 6,464,250 B1 * | 10/2002 | Faigle et al. | 280/730.2 |
| 6,508,487 B2 * | 1/2003 | Koster | 280/730.2 |
| 6,511,093 B2 * | 1/2003 | Buerkle et al. | 280/729 |
| 6,527,296 B2 * | 3/2003 | Bakhsh et al. | 280/730.2 |
| 6,533,315 B2 * | 3/2003 | Brown et al. | 280/733 |

FOREIGN PATENT DOCUMENTS

WO  WO 00/03897  7/1999

* cited by examiner

Primary Examiner—Paul N. Dickson
Assistant Examiner—Toan C To
(74) Attorney, Agent, or Firm—James D. Erickson; Sally J. Brown

(57) ABSTRACT

A tether assembly attachable to an inflatable cushion airbag module is disclosed that is usable in vehicles including trucks, SUVs, and other vehicles with abrupt rear surfaces. The tether assembly does not require that the rear tether be extended back from the rear edge of the airbag. The tether assembly may be used in connection with an inflatable cushion airbag secured to the front portion of the vehicle using a standard front tether system. The tether assembly is attached via a sliding mechanism to a rear tether used to secure an inflatable cushion module airbag to an anchoring point within the vehicle. The sliding mechanism is also connected to a retractor, preferably through a flexible connector made of the webbing material used in seat belts. The tether assembly is configured so that when the inflatable cushion airbag deploys during an accident, the retractor supplies rearward tension on the airbag by causing the sliding mechanism to move along the path of the tether. This tension on the airbag prevents it from shifting from the position designated to give the occupant optimal protection against lateral impact and rollover. Preferably, the retractor does not supply tension to the airbag until after it has deployed. A locking mechanism can be attached to the retractor to prevent a reduction in the tension applied to the inflatable cushion by restraining motion of the sliding mechanism in a direction away from the retractor.

59 Claims, 6 Drawing Sheets

REAR TETHER RETRACTOR FOR AN INFLATABLE CUSHION

BACKGROUND OF THE INVENTION

1. Field of the Invention

The present invention relates to inflatable safety cushion, or airbags, for vehicles. More specifically, the present invention relates to a method and apparatus for restraining side impact airbags to enhance protection against impact and occupant excursion.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the explosion of pressurized gas from an inflator. Expanding gases from the inflator fill the airbags, which immediately inflate to protect the driver and/or a passenger from impact against the windshield, dashboard, and steering wheel.

Side impact airbags have also been developed in response to the need for protection from impact against the side of the vehicle (also known as lateral impact). These airbags, which are commonly referred to as "inflatable cushions" or "inflatable curtains," may be mounted in the vehicle over the doors, and may inflate during an accident to cover the windows, doors, and lateral surfaces of the vehicle. The inflatable cushion may also be connected to tethers that extend from the ends of the airbag to anchoring points within the vehicle. These tethers may exert tension on the inflated cushions to keep the cushions generally between the occupant and the lateral surface of the vehicle.

However, tether systems known in the art have a number of disadvantages. First of all, many known tether systems require that the tether be extended longitudinally away from both ends of the inflatable cushion. Consequently, the front tether must be extended from the front end of the inflatable cushion toward the front of the vehicle and the rear tether must be extended from the rear end of the inflatable cushion toward the rear of the vehicle. Such a design is incompatible with most trucks and sport utility vehicles ("SUVs") in which the passenger compartment of the vehicle ends abruptly behind a lateral surface over which it would be desirable to position a cushion. In these vehicles, there is typically insufficient space for tether extension rearward from the edge of the inflatable cushion.

One of the main purposes in attaching a tethering system to an inflatable cushion is to protect the occupant by applying tension to the inflatable cushion so as to secure the inflatable cushion in the proper position. Without such tension, there is an inherent risk that the inflatable cushion will improperly inflate and injure the occupant. Additionally, during rollover conditions, if the inflatable cushion is not secured into the proper position via tethers, the motion of the occupant may force the inflatable cushion out of an open window, thereby eliminating any possible safety benefits of the inflatable cushion.

While the tethering systems previously known in the art may mitigate some of these problems by tensioning the inflatable cushion, the tensioning force supplied by these systems is sufficient to disjoin the inflatable cushion from its mountings or cause that the inflatable cushion be positioned in a location that does not render the occupant with maximum impact protection.

Using a force sufficient to disjoin or improperly move the inflatable cushion creates various problems. An obvious example of this is that if the inflatable cushion is disjoined from its mountings or improperly positioned, it will no longer be covering the lateral surface of the vehicle, thereby allowing the occupant to sustain injury due to impact against the surface of the vehicle. Likewise, if the inflatable cushion is disjoined from its mountings, it will likely fall on or near the occupant, possibly exposing the occupant to hot gases or toxic substances.

Furthermore, side impact inflatable cushions are often classified according to the compaction process used to compact the inflatable cushion. In general, there are two different categories of cushions: those that are compacted by rolling and those that are compacted by accordion folding. However, many previously known tethering systems are designed for use with a specific compaction process and consequently, cannot be used with either a rolled or an accordion-folded inflatable cushion. Rather, a specific tethering system must often be designed for each type of inflatable cushion. As a result, the cost-effectiveness and interchangeability of known inflatable cushions have suffered somewhat.

Additionally, many known inflatable cushions and tethering systems are not suitable to prevent occupant excursion. "Occupant excursion" occurs when the vehicle occupant is ejected from the vehicle, usually through an open door or window, during an accident. Obviously, occupant excursion can be very dangerous, especially during rollover conditions. However, since many known tethering systems can cause the inflatable cushion to be disjoined from its mountings, thereby exposing the window and door of the vehicle, these systems may not provide maximum protection against occupant excursion.

Accordingly, a need exists for a novel tethering system that is suitable for use in vehicles that do not have sufficient interior space behind the inflatable cushion to extend a rear tether. Furthermore, a need exists for such a tethering system that does not require a volatile tensioning device that could improperly deploy and cause injury or impair operation of the inflatable cushion as well as provide maximum protection against occupant excursion.

SUMMARY OF THE INVENTION

The apparatus of the present invention has been developed in response to the present state of the art of side impact airbags, and more particularly, in response to the problems associated with inclusion of rear tether systems in vehicles such as trucks and SUVs. In accordance with the invention embodied and broadly described herein, novel tether assemblies along with methods of installing and using such tether assemblies to provide enhanced side impact and rollover protection are disclosed.

The novel systems and methods of the present invention may operate to allow tether systems to be used with side impact airbags in trucks and SUVs. Current tethering systems typically require that the rear tether be extended rear-ward from the rear edge of the window. However, in vehicles such as trucks and SUVs, there is often insufficient space to extend such a tether because the vehicle has an abrupt rear surface immediately rearward of the position at which the airbag is to be installed. By contrast, the current invention enables a manufacturer to use a tethering system for side impact airbags in trucks and SUVs because the rear tether does not have to be extended rearward from the rear edge of the airbag. Through the use of a sliding mechanism, a retractor, and a locking mechanism, the present invention may allow the rear tether to be extended in any direction, while providing the necessary tension.

In one embodiment of the invention, a rear tether is attached at one end to the cushion and at the other end to a rear anchoring point within the vehicle. An intermediate portion of the tether may pass through a sliding mechanism. The intermediate portion of the tether may be configured such that the sliding mechanism can slide along the intermediate portion. The sliding mechanism may also be attached to a retractor configured to exert tension on the sliding mechanism, thereby pulling the intermediate portion toward the retractor. A locking mechanism adjacent to the retractor may ensure that the sliding mechanism cannot move away from the retractor and thereby release the tension on the airbag. The retractor and locking mechanism may thus operate in concert to supply the rear tether with the tension necessary to hold the deployed airbag in its proper place.

In one embodiment of the invention, the retractor is connected to the sliding mechanism via a flexible connector. The retractor may draw the sliding mechanism toward the retractor taking up the flexible connector through simple winding or a similar process. The length of the flexible connector may be selected so that during deployment of the inflatable cushion, there is still slack in the flexible connector. It is only after deployment that the retractor fully removes the slack in the flexible connector. This configuration of the flexible connector may prevent the retractor from exerting a magnitude of force on the airbag that could damage the inflatable cushion during normal operation of the vehicle, disjoin the inflatable cushion from its mountings, or pull the inflatable cushion out of the position designed by the manufacturers to give maximum impact protection.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings only depict typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by numerals throughout. It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented by FIGS. 1 through 6, is not intended to limit the scope of the invention, as claimed, but is merely representative of presently preferred embodiments of the invention.

Figure 1:
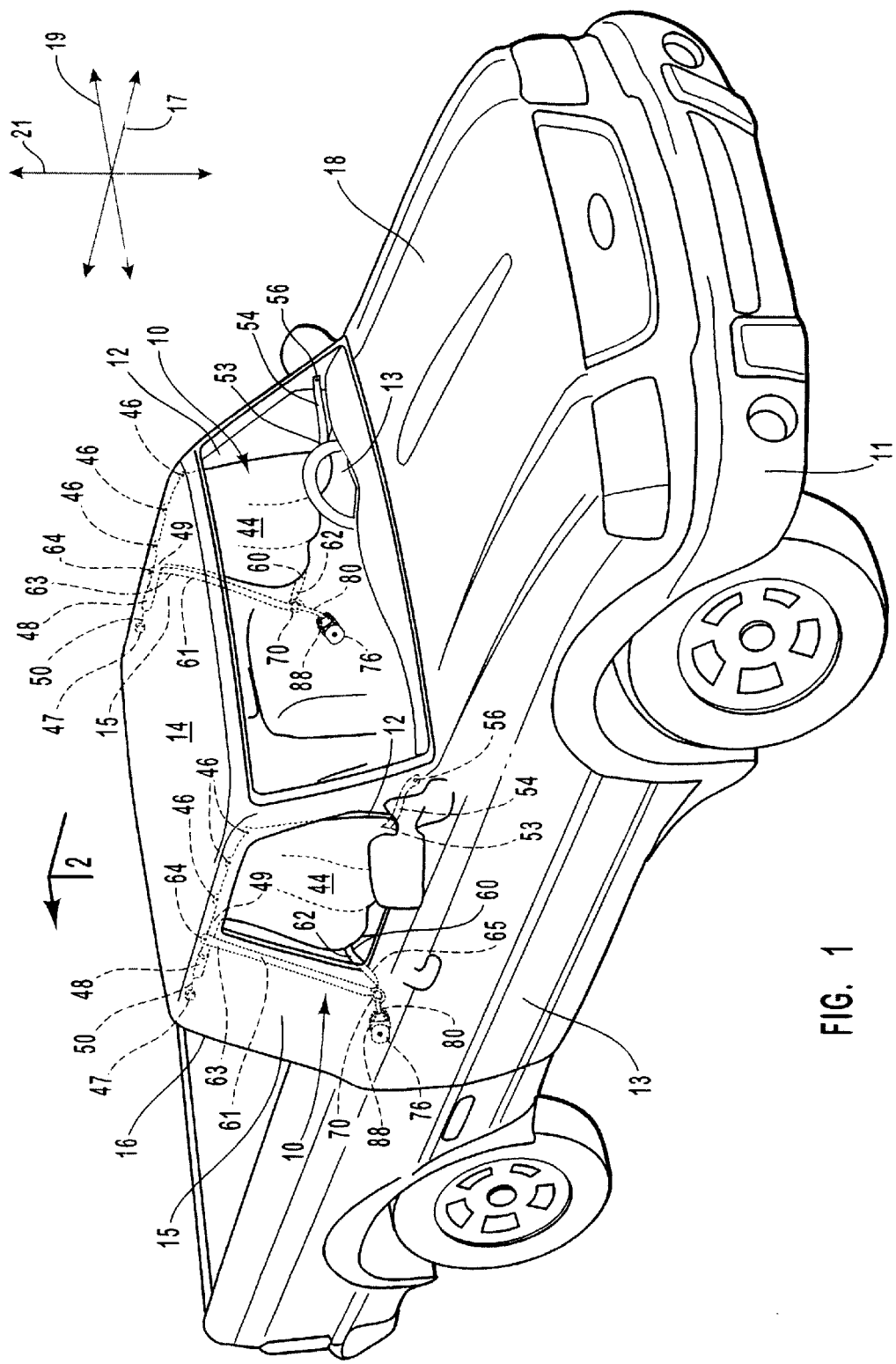
FIG. 1 is a perspective view of a vehicle with a deployed inflatable cushion module according to the present invention including a rear tethering assembly configured to keep a cushion properly positioned for lateral impact protection.

Referring to FIG. 1, one possible embodiment of a tether assembly 10 incorporating the novel features of the present invention is shown. The tether assembly 10 may be situated within vehicle 11, which need not be as shown, but may be any type of vehicle. The vehicle in the embodiment illustrated in the Figures is a truck of the type known in the art having a longitudinal direction 17, a lateral direction 19, and a transverse direction 21. Specifically, FIG. 1 shows the tether assembly 10 attached to a vehicle that has a window 12, a door 13, a roof 14, a lateral surface 15 encompassing window 12 and door 13, an abrupt rear surface 16, a floor (not shown), and a front portion 18. A vehicle with "an abrupt rear surface" is a vehicle similar in shape to a truck or a SUV in that the rear surface of the vehicle is positioned proximate the rear edge of the windows.

A "lateral surface" of a vehicle is the side portion of the vehicle which houses the doors and windows.

Figure 2:
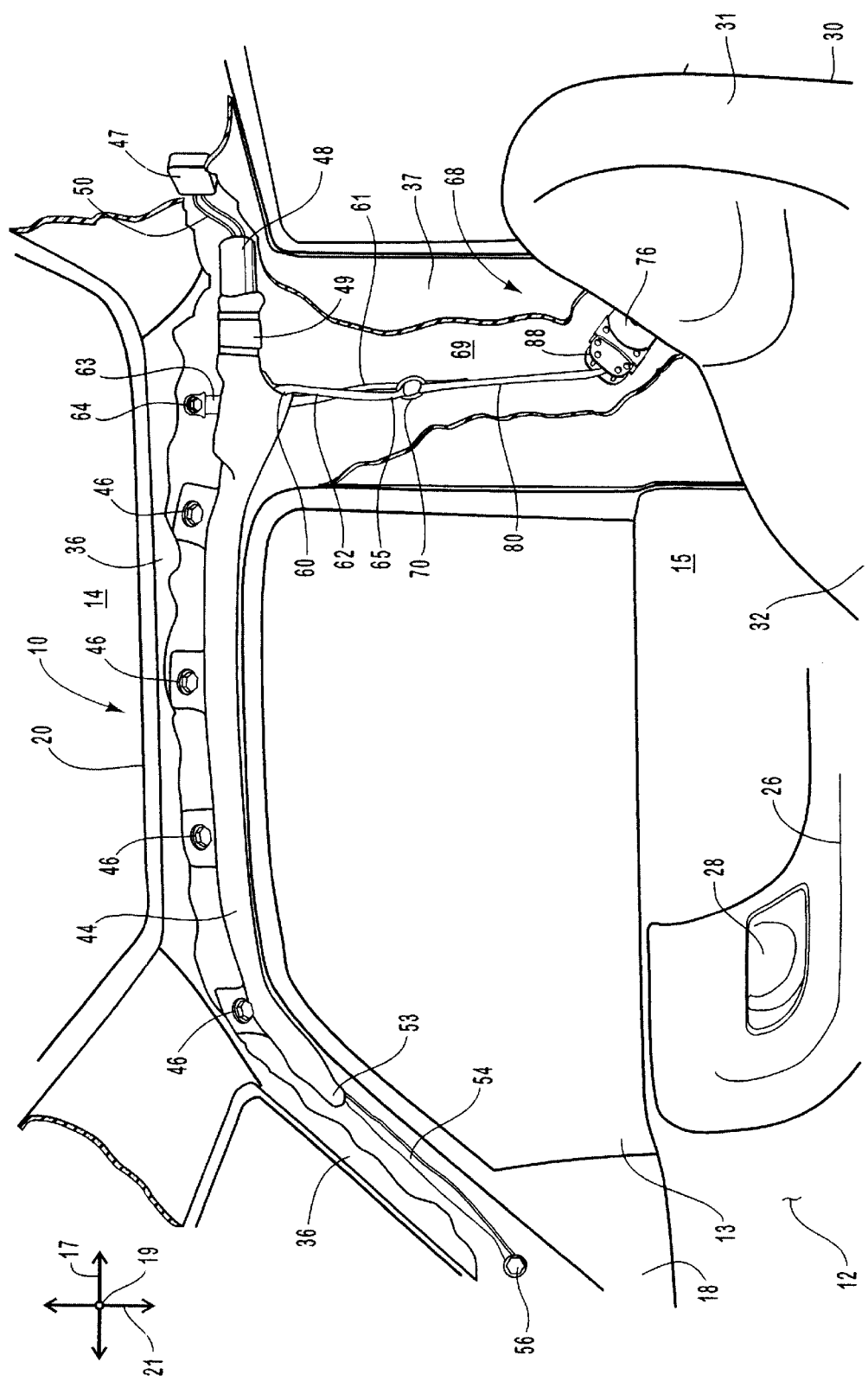
FIG. 2 is a side elevation view of the vehicle of FIG. 1, depicting the inflatable cushion module is in the stowed configuration.

Referring to FIG. 2 the tether assembly 10 is depicted as viewed from the inside of the vehicle 11. A roof rail 20 may be positioned at the junction of door 13 with the roof 14. A "roof rail" is a post or beam and positioned on the inside of the vehicle's roof. Also, within vehicle 1, there may be an armrest 26 and a latch 28 that opens the door 13, both positioned on the door 13. Adjacent to the door 13 is a seat 30, which has an upright portion 31, and a bottom portion 32. In the embodiment of the invention depicted in FIG. 2 the seat 30 is shown is a bucket seat as known in the art. However, the invention is not limited to this embodiment as different embodiments will use the invention with other types of seats known in the art, including, but not limited to benches, bucket seats, and child seats.

Trim 36 is placed on lateral surface 15 above and forward of window the 12 to improve the appearance of the interior of vehicle 11. If desired, multiple trim segments may be positioned above and forward of the window 12, in place of trim 36. Corresponding trim 37 may be placed on lateral surface 15 behind window 12. The trim 36, 37 may be made of plastic, vinyl, or other materials known or used in the art. Various airbag components may be concealed behind the trim 36, 37 in a manner that will be described subsequently.

Figure 3:
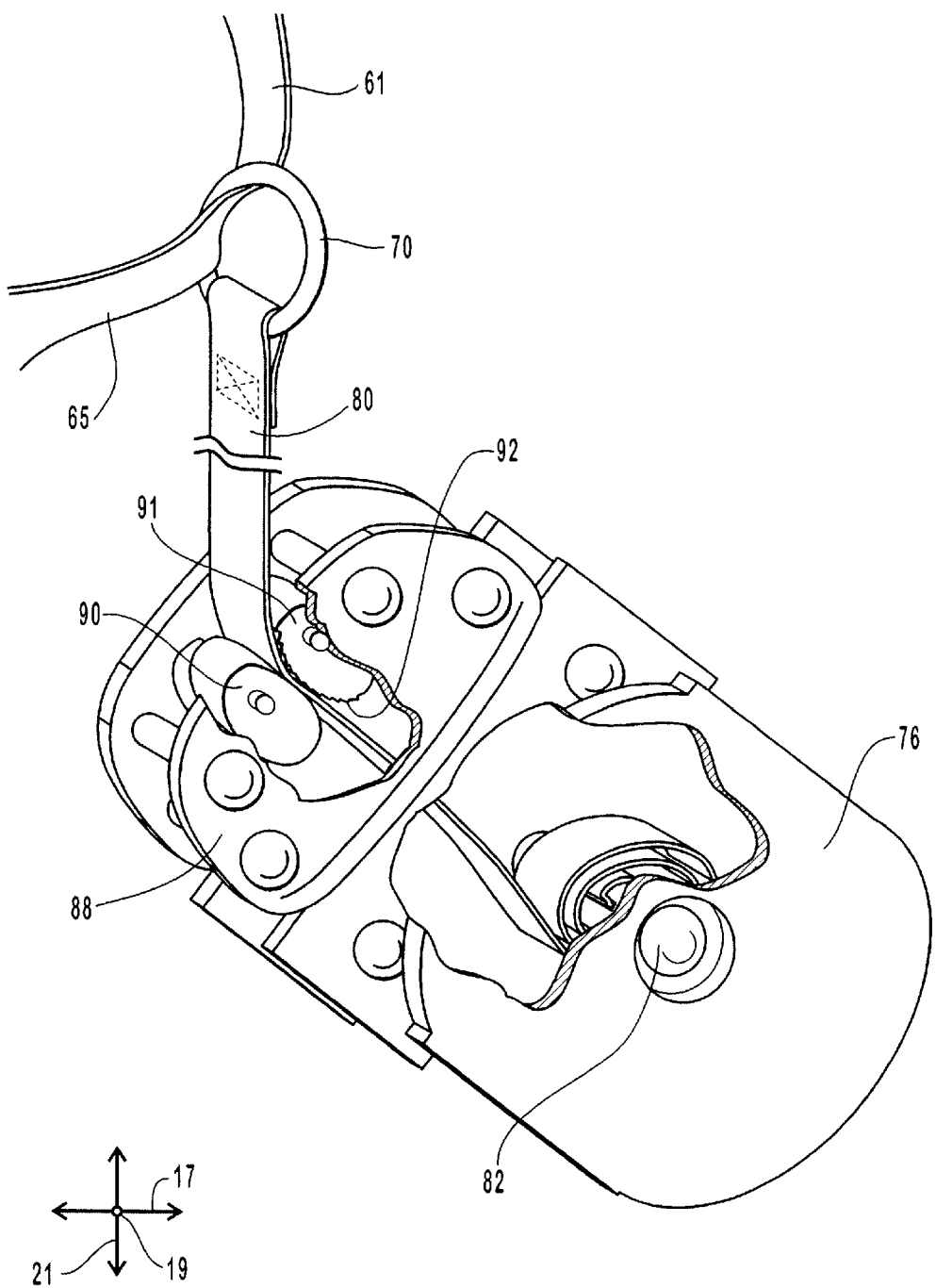
FIG. 3 is an enlarged view of one possible embodiment of the tethering assembly which may include the retractor, the locking mechanism, the flexible connector, and the sliding mechanism of FIG. 1.
Figure 4:
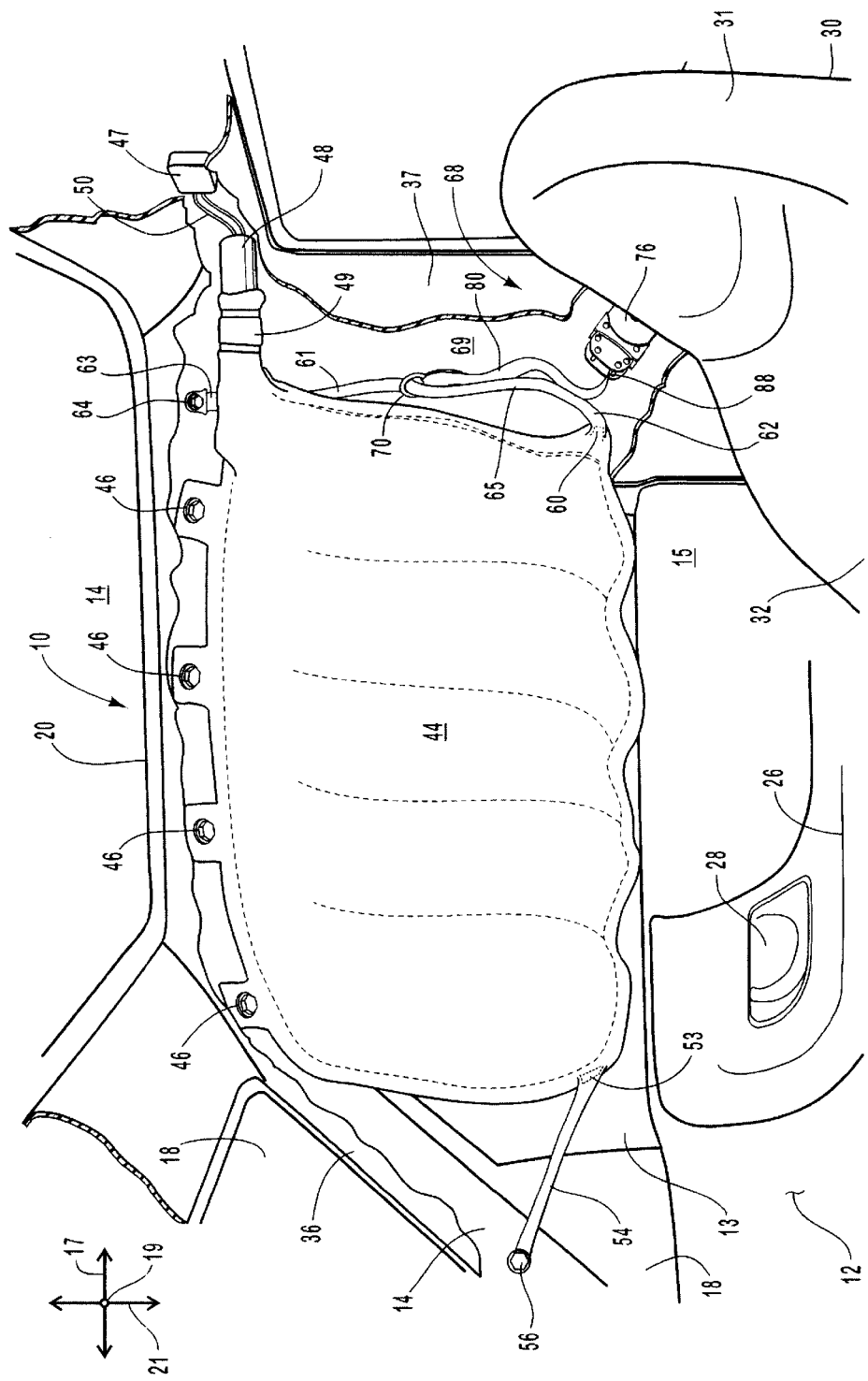
FIG. 4 is a side elevation view of the vehicle of FIG. 1 depicting the inflatable cushion module in a partially deployed configuration immediately after inflation, prior to complete take-up of the flexible connector.

An inflatable cushion 44 may be attached to lateral surface 15 proximate the roof rail 20 via fasteners 46 above window 12 and door 13. The inflatable cushion 44 may be of any kind known in the art and may be constituted of any flexible substantially gastight material. This cushion 44 may have two distinct configurations: a stowed configuration as depicted in FIG. 2 and a deployed configuration as shown by FIGS. 3 and 4 in which the cushion 44 is disposed to cover a portion of the lateral surface 15 beside a vehicle occupant.

In the stowed configuration, the inflatable cushion 44 may have a thin shape that can be stored compactly above door 13; the length of the bag may span most of the longitudinal length of the lateral surface 15. In the deployed configuration, the inflatable cushion 44 may be filled with gas and may extend to cover a portion of the lateral surface 15, including a portion of the door 13 and the window 12 to provide lateral impact protection to the occupant during an accident by tending to keep the occupant from passing through a protection plane. A "protection plane" is an imaginary vertical plane extending from the roof rail 20 to the floor of the vehicle parallel and adjacent to the lateral surface 15. Specifically, the protection plane of vehicle 11 lies between the lateral surface 15 and the inflatable cushion 44 in the deployed configuration. If an occupant positioned on the seat 30 passes through the protection plane during an accident or rollover, he or she will impact the lateral surface 15, including the door 13 or the window 12. Hence, the purpose of the inflatable cushion 44 is to inflate during an accident or rollover so that the occupant impacts the inflatable cushion 44 and does not reach, let alone pass through, the protection plane.

The dimensions and positioning of inflatable cushion 44 my be selected so as to render maximum lateral impact protection for the occupant when the cushion 44 deploys. Those of skill in the art will recognize that the dimensions, placement, and deployment characteristics of the cushion 44 may be altered in a number of ways to provide optimal protection for occupants of the vehicle 11.

The inflatable cushion module 10 deploys to move from the stowed configuration. Specifically, if the vehicle 11 is in an accident, a rapid change of acceleration will occur. This change may be detected by an accelerometer 47 which signals an inflator 48 to deploy. The inflator 48 is attached to inflatable cushion 44 at inflation point 49. In the example of FIG. 2, the inflator 48 may be disposed partially within an inlet port of the inflatable cushion 44. Accelerometer 47 can signal inflator 48 through various ways known in the art. One possible method of signaling is by using an electric signal carried by an electric wire 50, as depicted in FIG. 2.

The inflator 48 may be of the type known in the art. Specifically, the inflator 48 may take the form of any device that can rapidly produce sufficient gas to fill inflatable cushion 44. Thus, when the inflator 48 receives the signal from the accelerometer 47, the inflator 48 produces gases that enter the inflatable cushion 44 through the inflation point 49. The entering gases cause inflatable cushion 44 to inflate and expand into the deployed configuration, which inflatable cushion 44 tends to keep the occupant from passing through the protection plane.

The inflation point 49 can be located anywhere on inflatable cushion 44. In the configuration of FIG. 2, the inflation point 49 is located proximate the rear edge of inflatable cushion 44. However, in different embodiments of the invention, the location of the inflation point 49 my be different. All of these embodiments are contemplated by the present invention.

The fasteners 46 used to attach the inflatable cushion 44 to the lateral surface 15 can be selected from any of the types of fasteners The fasteners 46 may for example, be tabs, tethers, wire restraints, screws, nails, bolts, clips, clamps, rivets, and/or other members designed to connect the inflatable cushion 44 to the vehicle 11. FIG. 2 depicts the use of tabs in conjunction with rigid fasteners such as screws or bolts. The number and arrangement of fasteners 46 used to attach the inflatable cushion 44 to the vehicle 11 is not restricted to the embodiment of FIG. 2 which depicts five fasteners 46 securing the inflatable cushion 44 to the roof rail 20. Other embodiments will attach the inflatable cushion 44 with a different number arrangement, and/or type of fasteners.

A front attachment point 53 is also located on the inflatable cushion 44. The front attachment point 53 connects the inflatable cushion 44 to the front tether 54. The front attachment point 53 may be positioned anywhere on the forward portion of the inflatable cushion 44. Alternative embodiments of the invention may position the front attachment point 53 differently than shown in FIG. 2.

A front tether 54 may be attached at one end to the front attachment point 53. The other end of the front tether 54 is attached to a front anchoring point 56, which may be positioned at various locations in the interior of the vehicle 11. The embodiment of FIG. 2 has the front anchoring point 56 in a position forward of the inflatable cushion 44 on the lateral surface 15.

Moreover, as shown in FIG. 2, the front tether 54 and the front anchoring point 56 may be positioned so as to be covered by trim 36 when the inflatable cushion 44 is in the stowed configuration.

A rear tether attachment point 60 of the inflatable cushion 44 may also be connected to a rear tether 61 at first end 62. Rear attachment point 60 may be positioned anywhere on the rear portion of the inflatable cushion 44. In the configuration of FIG. 2, the rear attachment point 60 is located proximate a bottom edge of the inflatable cushion 44. Since the inflatable cushion 44 gas been compacted along the roof rail 20, the rear attachment point 20 is also located along the roof rail 20 when the inflatable cushion 44 is in the stowed configuration, as shown in FIG. 2.

The rear tether 61 extends along a tether path 66 to a second end 63, which is connected to rear anchoring point 64. The "tether path" refers to the pathway along which the length of the tether 61 is disposed between the rear attachment point 60 and the rear anchoring point 64. The rear anchoring point 64 may be located at a variety of positions inside of the vehicle 11 rearward of the inflatable cushion 44. In the embodiment of FIG. 2, the rear anchoring point 64 is located on a surface 69 substantially rearward of the lateral surface 15 and is covered by the trim 37 that covers the rear tether 61. A "surface substantially rearward" means a majority of the surface is positioned closer to the abrupt rear surface of the vehicle than is lateral surface 15. Other embodiments include positioning the rear anchoring point 64 proximate the roof rail 20 or on the abrupt rear surface 16.

The rear tether 61 may have an intermediate portion 65 between first end 62 and second end 63 of rear tether 61. The intermediate portion 65 may be coupled to a tensioning system 68 configured to exert pressure on the intermediate portion 65 of the rear tether 61 such that a substantial portion of the tension transmitted by the rear tether 61 to the inflatable cushion 44 is in the longitudinal direction 17. Thus in one embodiment of the invention, when the inflatable cushion 44 is in the deployed configuration, the tension transmitted by the rear tether 61 is directed rearward of the occupant approximately the height of the occupant's waistline. The front tether 54 may similarly exert a force in the longitudinal direction at the height of the occupant's waistline, so that the front and rear tethers 54, 61 cooperate to keep the inflatable cushion 44 in place.

The tensioning system 68 comprises a sliding mechanism 70 that slidably engages the intermediate portion 65 of the rear tether 61 and a retractor 76. "Slidably connected" or "slidably engaged" means that sliding mechanism 70 can slide or move along the tether path 66 of the rear tether 61.

The sliding mechanism 70 may comprise any device that can slide or move along the tether path 66. In one embodiment, the sliding mechanism 70 comprises a series of rollers (not shown) configured so that intermediate portion 65 passes between the rollers and allows the rollers to slide along the rear tether 61. In another embodiment of the invention, sliding mechanism 70 comprises a flexible loop (not shown) that encircles the intermediate portion 65 with clearance so that the flexible loop is along the rear tether 61. In the embodiment FIG. 2, the sliding mechanism 70 is a ring through which the intermediate portion 65 passes relatively freely to allow the ring to move along the rear tether 61. Additionally, the ring accommodates twisting of the rear tether 61.

By employing a sliding mechanism 70 configured to permit twisting of the rear tether 61, the rear tether assembly 10 overcomes a weakness of known tethering systems in that the rear tether assembly 10 can be used with various types of side impact airbags. The use of the sliding mechanism 70 compensates for any twisting of the rear tether 61 that occurs during deployment. Thus, as depicted in FIG. 2, the inflatable cushion 44 may be compacted by rolling or may be compacted by accordion folding or in some other manner.

The sliding mechanism 70 may be attached to the retractor 76 such that the retractor 76 exerts tension on the sliding mechanism 70 to urge the sliding mechanism 70 away from the inflatable cushion 44. The retractor 76 is connected to a surface of the vehicle 11, such as the surface 69, via fasteners (not shown) that may provide rigid attachment or may pivotally attach the retractor 76 to the surface 69 so that the retractor 76 is able to rotate during deployment of the inflatable cushion 44.

In the embodiment of FIG. 2, the retractor 76 is positioned on the surface 69 below the sliding mechanism 70 and is covered by the trim 37. However, the retractor 76 may be located at different positions within the vehicle 11 so long as the retractor 76 retains its capacity to exert tension on the sliding mechanism 70 to keep the inflatable cushion 44 in the proper position.

The sliding mechanism 70 may be attached to the retractor 76 via a flexible connector 80. The flexible connector 80 can be composed of various materials including chains, braided fiber or polymer based ropes, a webbing material known in the art as the material used to make seatbelts, or cables substantially composed of metallic material. FIG. 2 shows use of the webbing material.

The flexible connector 80 may be attached to the retractor 76 in such a way that the retractor 76 can exert rearward tension on flexible connector 80, which in turn exerts rearward tension on the sliding mechanism 70. The retractor 76 may be any device capable of exerting tension on the flexible connector 80. As will be demonstrated subsequently, the retractor 76 need not provide a force large enough to pull the inflatable cushion 44 into the deployed configuration. Thus the retractor 76 may be substantially composed of a comparatively lightweight material such as plastic.

Referring to FIG. 3, the retractor 76 of FIGS. 1 and 2 is illustrated. The flexible connector 80 may be attached to a rotationally biased spindle 82 that is configured to rotate and wind the flexible connector 80 onto itself. The rotationally biased spindle 82 may be driven by any biasing member (not shown) including linear springs, torsional springs, leaf springs, gas springs and the like. As the rotationally biased spindle 82 winds the flexible connector 80, the effective length of the flexible connector 80 is shortened, thereby drawing the sliding mechanism 70 towards the retractor 76.

As shown in FIG. 3, a locking mechanism 88 is also provided. The locking mechanism 88 may be located anywhere along the flexible connector 80; as shown, the locking mechanism 88 may be positioned directly adjacent to the retractor 76 so that the locking mechanism 88 and the retractor 76 are attached together. If desired, the retractor 76 and the locking mechanism may even share a common housing.

The locking mechanism 88 may act to prevent sliding mechanism 70 from moving away from the retractor 76 by preventing withdrawal of the flexible connector 80 from the retractor 76. In the embodiment shown in FIG. 3, the locking mechanism 88 comprises engagement members 90 and 91 positioned such that the flexible connector 80 passes between and makes contact with the engagement members 90 and 91. The engagement member 91 may have gripping teeth 92 that allow the flexible connector 80 to move in a direction that corresponds to movement of sliding mechanism 70 towards retractor 76, but does not allow the flexible connector 80 to move in the opposite direction. In this embodiment, the locking mechanism 88 may only allow the flexible connector 80 to extend away from the retractor 76 a short distance, such as about 10 millimeters or less.

In place of the locking mechanism 88 shown in FIG. 3, alternative structures that provide similar function may be used. For example, a ratchet mechanism may be used in place of the engagement members 90, 91. The ratchet mechanism may include a gear (not shown) coupled to the rotationally biased spindle 82 and a blocking member (not shown) adjacent to the gear. The blocking member may mesh with teeth of the gear to impede rotation of the rotationally biased spindle 82 in a direction that would permit withdrawal of the flexible connector 80 from the retractor 76.

Referring to FIG. 4, the inflatable cushion 44 is shown in a partially deployed configuration. More specifically, the inflatable cushion 44 has inflated fully so that part of front thether 54 is not covered by the trim 36. However the flexible connector 80 has not yet been fully taken up by the retractor 76. The length of flexible connector 80 and the take up force of the retractor 76 are configured so that directly after deployment of the inflatable cushion 44 some slack is still present in the flexible connector 80. "Deployment" of the inflatable cushion 44 is defined to be the process, triggered by the inflation event, in which the inflatable cushion 44 expands, fills with gases, and becomes properly positioned so as to prevent the occupant from passing through the protection plane of the vehicle 11. Only after the inflatable cushion 44 fully inflates does the retractor 76 finish winding the flexible connector 80 so that the slack is removed from the flexible connector 80.

Figure 5:
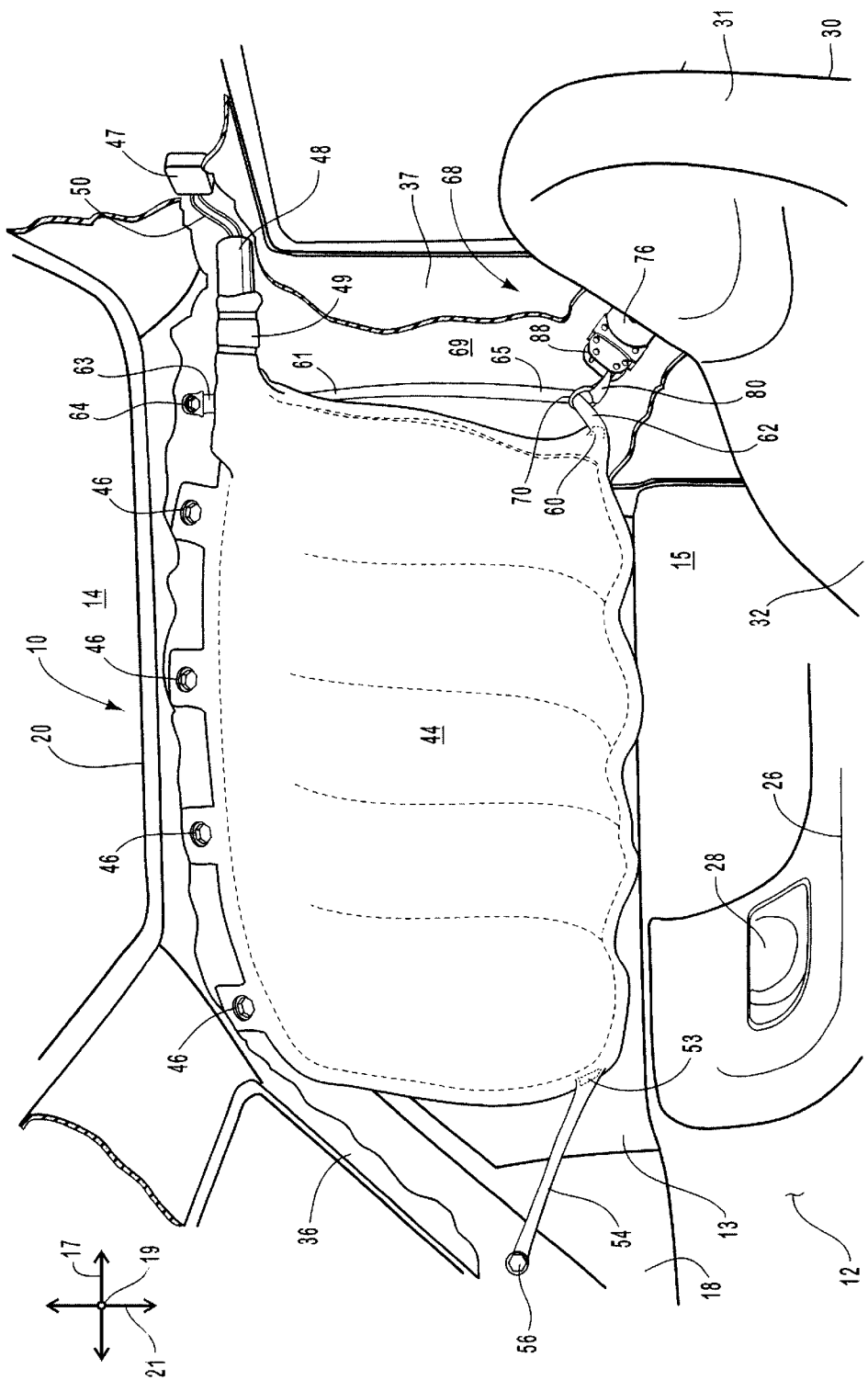
FIG. 5 is a side elevation view of the vehicle of FIG. 1 depicting the inflatable cushion module in a fully deployed configuration in which substantially all slack in the flexible connector has been removed to fully restrain the cushion in the proper position.

Referring to FIG. 5, the inflatable cushion 44 is shown in the deployed configuration, in which all slack in the flexible connector 80 has been fully taken up by retractor 76. As such, the tension supplied to the rear tether 61 will be at a height approximate the occupant's waistline. By placing the supplied tension at the occupant's waistline, the tensioning system 68 ensures that the inflatable cushion 44 covers all of window 12. Moreover, supplying the tension at the occupant's waistline ensures that both the top and bottom of the inflatable cushion 44 are secured into proper position, thereby rendering optimum stability for the inflatable cushion 44 and preventing the inflatable cushion 44 from being disjoined from its mountings.

The rear tether assembly 10 provides safer and more effective inflation by permitting slack to remain in the flexible connector 80 during inflation of the inflatable cushion 44. If the rear tether 61 were tightly tensioned during inflation of the inflatable cushion 44, the tension could pull on the inflating inflatable cushion 44 in such a way that the inflatable cushion 44 would be disjoined from its mounting or moved from the location at which it would provide maximum impact protection. Furthermore, if the inflatable cushion 44 were to inflate under tension in the longitudinal direction 17, the inflatable cushion 44 could be pinched such that full inflation of inflatable cushion 44 would not occur. By allowing slack to remain in the flexible connector 80 until after the inflation event, the present invention is able to apply tension to the inflatable cushion 44 so as to hold it in the proper position while avoiding the problems described above.

Although it is desirable for the retractor 76 to operate slowly enough to permit inflation prior to the application of tension, it is also desirable for the slack in the flexible connector 80 to be removed prior to impact of the occupant against the inflatable cushion 44. Since the force applied by the retractor 76 is comparatively small, some mechanism is needed to ensure that the rear tether 61 is tightened prior to impact. The arrangement of the flexible connector 80 with respect to the rear tether 61 provides such a function.

More specifically, the tension exerted by the retractor 76 on the flexible connector 80 causes the motion of the first end 62 toward the sliding mechanism 70 to be comparatively more rapid than the motion of the sliding mechanism 70 toward the retractor 76.

Thus, the effect of the connection between the sliding mechanism 70 and the rear tether 61 is to provide a mechanical disadvantage that operates between the retractor 76 and the first end 62. A comparatively smaller force is exerted on the first end 62, but a comparatively large displacement occurs. As a result, the retractor 76 is able to tighten the rear tether 61 prior to impact of the vehicle occupant against the inflatable cushion 44. One of the effects of having the retractor 76 tighten the rear tether 61 prior to impact is that the tension on rear tether 61 is supplied by the occupant impacting the inflatable cushion 44, which is useful to prevent kinks or closures from entering the inflatable cushion 44 which can prevent the inflatable cushion 44 from deploying properly.

Figure 6:
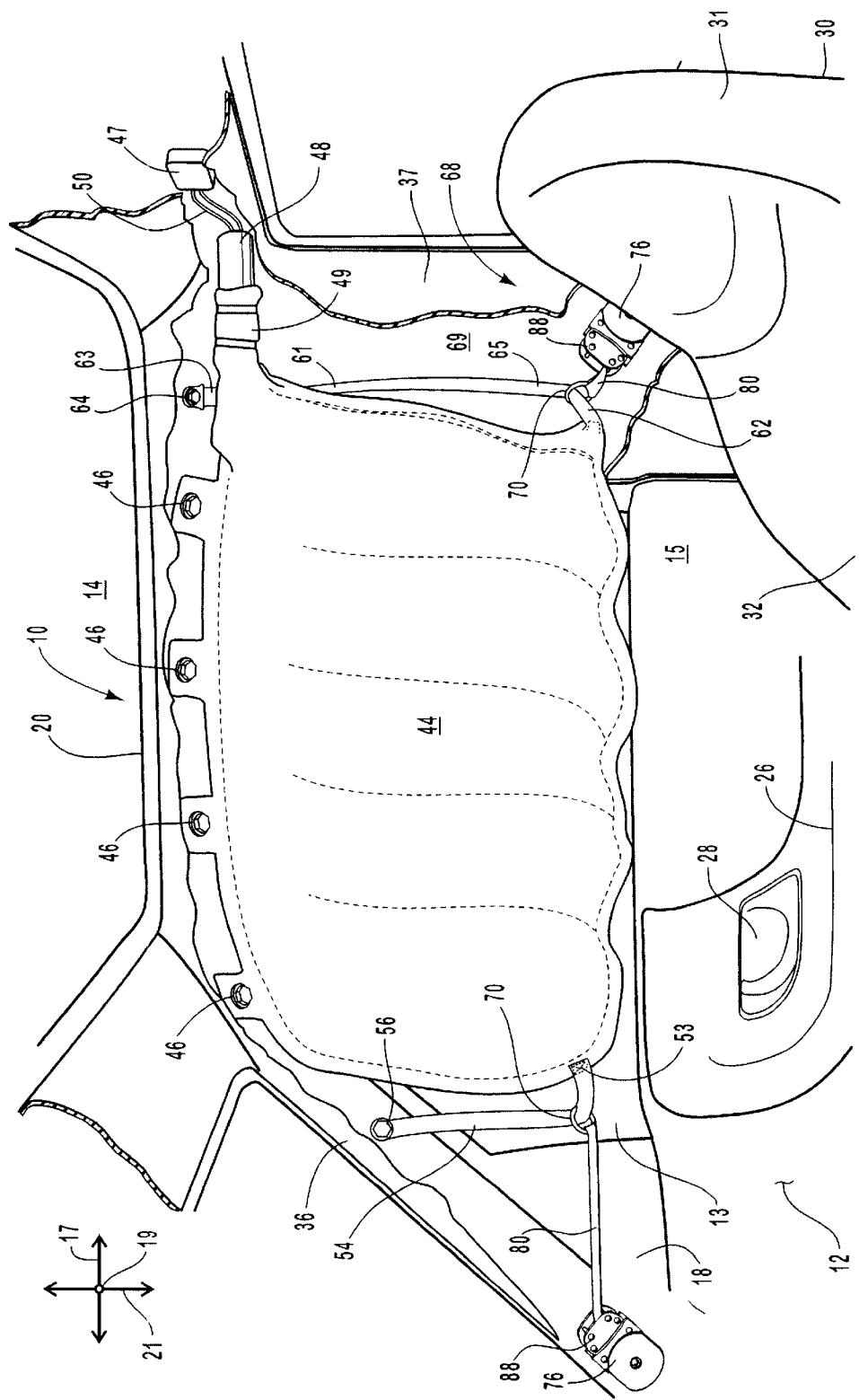
FIG. 6 is a side elevation view of a vehicle depicting an embodiment of the invention in which a tether assembly similar to that of FIG. 5 is utilized in a front tethering system.

Referring to FIG. 6, a front tether assembly 110 may be incorporated into a vehicle such as the vehicle 11 of FIG. 1. The front tethering assembly may transmit tension from the front end of the inflatable cushion 44 in a forward direction at the height of the occupant's waistline. Front tether assembly 110 operates in a similarly to rear tethering assembly 10. For example, after the inflatable cushion 44 deploys, slack remains in the flexible connector 80. The retractor 76 then takes up this slack by winding flexible connector 80, thereby permitting the occupant to supply tension to the front tether assembly 110 upon impact with the inflatable cushion 44.

Many of the problems associated with prior art tethering assemblies are addressed by the teachings of the present invention. From the above discussion, it will be appreciated that the present invention provides novel tether assemblies that allow side impact airbags to be more efficiently used especially in vehicles such as SUVs and trucks that have an abrupt rear surface that might otherwise inhibit airbag operation. The present tether assemblies also provide a mode whereby the airbag can be properly positioned such that the occupant receives maximum impact protection, without having the risk that the airbag will be disjoined from its mountings during the inflation event. Moreover, by positioning the airbag is properly positioned so as to provide the occupant with maximum impact protection, the present tether assemblies prevent occupant excursion during an accident.

The present invention may be embodied in other specific forms without departing from its structures, methods, or other essential characteristics as broadly described herein and claimed hereinafter. The described embodiments are not to be considered in all respects only as illustrative, and not as restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An inflatable curtain module configured to provide side impact protection for an occupant of a vehicle, the inflatable curtain module comprising:
   a cushion configured to inflate inward of a lateral surface of the vehicle in an inflation direction;
   a front tether attached to the cushion and to a front tether anchoring point positioned forward of the cushion within the vehicle;
   a rear tether comprising a first end attached to the cushion and a second end fixedly attached to a rear tether anchoring point positioned rearward of the cushion within the vehicle;
   a sliding mechanism slidably capturing the rear tether;
   a retractor connected to the sliding mechanism, to exert rearward tension on the sliding mechanism; and
   a locking mechanism that restrains motion of the sliding mechanism away from the retractor.

2. An inflatable curtain module as in claim 1, wherein the cushion is rolled.

3. An inflatable curtain module as in claim 1, wherein the cushion is folded.

4. An inflatable curtain module as in claim 1, wherein the sliding mechanism comprises a structure selected from the group consisting of a ring encircling an intermediate portion of the rear tether, a flexible coupling loop encircling an intermediate portion of the rear tether, a roller assembly having a plurality of rollers positioned to sandwich an intermediate portion of the rear tether, and a housing having a hollow rectangular cross section sized to slidably contain a cross section of the rear tether.

5. An inflatable curtain module as in claim 1, wherein the retractor is substantially constructed of a plastic material.

6. An inflatable curtain module as in claim 1, wherein the rear tether anchoring point is positioned proximate a roof rail of the vehicle.

7. An inflatable curtain module as in claim 1, wherein the rear tether anchoring point is positioned on an abrupt rear surface of the vehicle.

8. An inflatable curtain module as in claim 1, wherein the rear tether anchoring point is positioned on an attachment surface of the vehicle, wherein the attachment surface is substantially rearward of and parallel to the lateral surface.

9. An inflatable curtain module as in claim 1 wherein the retractor is connectable to the sliding mechanism via a flexible connector, wherein the retractor exerts rearward tension on the flexible connector and in turn the flexible connector exerts rearward tension on the sliding mechanism.

10. An inflatable curtain module as in claim 9, wherein the flexible connector is constructed of a structure selected from the group consisting of a webbing material, a chain, a fiber-based rope, a polymer-based cord, and a metal cable.

11. An inflatable curtain module as in claim 9, wherein the flexible connector has a length selected to permit removal of substantially all slack from the flexible connector prior to impact of the occupant against the cushion.

12. An inflatable curtain module as in claim 11 wherein the retractor is configured to permit slack to remain in the flexible connector during inflation of the cushion.

13. An inflatable curtain module as in claim 9, wherein the locking mechanism is configured to restrict extension of the flexible connector from the retractor to less than about 10 millimeters.

14. An inflatable curtain module as in claim 9, wherein the retractor comprises a rotationally biased spindle configured to wind the flexible connector.

15. An inflatable curtain module as in claim 14, wherein the locking mechanism comprises a structure selected from the group consisting of a gear rotationally coupled to the rotationally biased spindle with a blocking member that impedes rotation of the gear in a direction corresponding to withdrawal of the flexible connector from the retractor, and a rotatable engagement member that grips the flexible connector to restrain motion of the flexible connector out of the retractor.

16. An inflatable curtain module having a stowed configuration in which the module is stored in a vehicle, and a deployed configuration in which the module is operable to provide lateral impact protection tending to keep an occupant of the vehicle from passing through a protection plane, the module comprising:
    a cushion configured to be disposed along a portion of the protection plane in the deployed configuration;
    a tether having a first end configured to be attached to the cushion, a second end configured to be attached to a tether anchoring point of the vehicle, displaced from the first end, and an intermediate portion between the first and second ends;
    a sliding mechanism slidably attachable to the intermediate portion; and
    a retractor that exerts force on the sliding mechanism to produce tension in the tether in the deployed configuration.

17. An inflatable curtain module as in claim 16, wherein the cushion is rolled.

18. An inflatable curtain module as in claim 16, wherein the tether anchoring point is positioned on an abrupt rear surface of the vehicle.

19. An inflatable curtain module as in claim 16, wherein the retractor is attached to the sliding mechanism via a flexible connector.

20. An inflatable curtain module as in claim 19, wherein the flexible connector comprises a webbing material.

21. An inflatable curtain module as in claim 19, wherein the sliding mechanism comprises a ring attached to the flexible connector and looped around the intermediate portion of the tether.

22. An inflatable curtain module having a stowed configuration in which the module is stored in the vehicle and a deployed configuration in which the module is operable to provide lateral impact protection, the module comprising:
    a cushion configured to be disposed longitudinally along a lateral surface of the vehicle in the deployed configuration;
    a tether extensible along a tether path between a tether anchoring point of the vehicle and the cushion to transmit tension between the tether anchoring point and the cushion, the tether comprising a first end attached to the cushion and a second end fixedly attached to the tether anchoring point; and
    a tensioning system configured to exert pressure on an intermediate portion of the tether such that a substantial portion of the tension transmitted by the tether to the cushion is in the longitudinal direction.

23. An inflatable curtain module as in claim 22, wherein the cushion is rolled.

24. An inflatable curtain module as in claim 22, wherein the tether is attached to the cushion proximate a bottom edge of the cushion in the deployed configuration.

25. An inflatable curtain module as in claim 22, wherein the tensioning system comprises:
    a sliding mechanism positioned proximate the tether and connected to the tether to allow the tether to slide along the sliding mechanism;
    a flexible connector connected to the sliding mechanism;
    a retractor that exerts tension on the flexible connector; and
    a locking mechanism that restrains motion of the sliding mechanism away from the retractor.

26. An inflatable curtain module as in claim 22, wherein the tensioning system produces tension such that a portion of the tension transmitted by the tether to the cushion in the deployed configuration is directed rearward of the occupant in a horizontal direction at a height proximate a waistline of the occupant.

27. An inflatable curtain module as in claim 22, wherein the tensioning system produces tension such that a portion of the tension transmitted by the tether to the cushion in the deployed configuration is directed forward of the occupant in a horizontal direction at a height proximate a waistline of the occupant.

28. A tether assembly configured to be attached to a cushion of an air bag system designed to protect an occupant of a vehicle from lateral impact, the assembly comprising:
    a tether having a first end configured to be attached to the cushion, a second end configured to be attached to a tether anchoring point of the vehicle, displaced from the first end, and an intermediate portion between the first end and the second end;
    a sliding mechanism that slidably engages the intermediate portion of the tether; and
    a retractor attached to the sliding mechanism, to draw the sliding mechanism away from the cushion.

29. A tether assembly as in claim 28, wherein the tether has a bend proximate the sliding mechanism.

30. A tether assembly as in claim 28, wherein the tether anchoring point is positioned on a surface rearward of the lateral surface of the vehicle.

31. A tensioning assembly for a tether having a first end, a second end, and an intermediate portion, the first end attachable to a cushion of an air bag system designed to provide side impact protection of an occupant of a vehicle, the second end attachable to an anchoring point within the vehicle, the tensioning assembly comprising:
    a sliding mechanism slidably connected to the intermediate portion of the tether;
    a flexible connector connected to the sliding mechanism;
    a retractor that takes up at least a portion of the flexible connector to exert tension on the flexible connector; and a locking mechanism that restrains motion of the sliding mechanism away from the retractor.

32. A tensioning assembly as in claim 31, wherein the sliding mechanism comprises a ring encircling an intermediate portion of the rear tether.

33. A tensioning assembly as in claim 31, wherein the flexible connector comprises a webbing material.

34. A tensioning assembly as in claim 31, wherein the locking mechanism comprises a rotatable engagement member configured to grip the flexible connector to restrain motion of the flexible connector out of the retractor.

35. A tensioning assembly as in claim 31, wherein the retractor comprises a rotationally biased spindle configured to wind the flexible connector.

36. A tensioning assembly as in claim 31, wherein the retractor is positioned in relation to the tether such that motion of the sliding mechanism toward the retractor initiates comparatively more rapid motion of the first end of the tether.

37. A tensioning assembly for a tether with a first end attachable to a cushion of an air bag system designed to provide side impact protection of an occupant of a vehicle and a second end attachable to a tether anchoring point within the vehicle, the tensioning assembly comprising:
  a sliding mechanism slidably attached to the intermediate portion of the tether;
  a flexible connector connected to the sliding mechanism; and
  a retractor that takes up at least a portion of the flexible connector to exerts tension on the flexible connector, wherein the retractor is positioned in relation to the tether such that motion of the sliding mechanism toward the retractor initiates comparatively more rapid motion of the first end of the tether.

38. A tensioning assembly as in claim 37, wherein the sliding mechanism comprises a ring encircling an intermediate portion of the rear tether.

39. A tensioning assembly as in claim 37, wherein the retractor comprises a rotationally biased spindle configured to wind the flexible connector.

40. A tensioning assembly as in claim 37, wherein the flexible connector comprises a webbing material.

41. A method for restraining motion of an occupant of a vehicle through a protection plane, the method comprising:
  providing a cushion configured to deploy along the protection plane;
  providing a tether having a first end, a second end, and an intermediate portion disposed between the first and second ends;
  affixing the first end to the cushion;
  fixedly attaching the second end to a tether anchoring point of the vehicle;
  providing a tensioning system; and
  connecting the tensioning system to the intermediate portion to actuate the tether such that the tether exerts tension on the cushion, the tension tending to keep the cushion within the protection plane.

42. A method as in claim 41, wherein providing a cushion configured to deploy along the protection planes comprises providing a rolled cushion.

43. A method as in claim 41, wherein affixing the first end to the cushion comprises affixing the first end proximate a bottom edge of the cushion in the deployed configuration.

44. A method as in claim 41, wherein providing a tensioning system comprises providing a sliding mechanism positioned proximate the tether and connected to the tether to allow the tether to slide along the sliding mechanism, a flexible connector connected to the sliding mechanism, a retractor that exerts tension on the flexible connector, and a locking mechanism that restrains motion of the sliding mechanism away from the retractor.

45. A method as in claim 44, further comprising positioning the retractor in relation to the tether such that motion of the sliding mechanism toward the retractor initiates comparatively more rapid motion of the first end of the tether.

46. A method as in claim 41, further comprising configuring the tensioning system to produce tension such that a portion of a tension transmitted by the tether to the cushion in the deployed configuration is directed rearward of the occupant in a horizontal direction at a height proximate the waistline of a occupant.

47. A method as in claim 41, further comprising configuring the tensioning system to produce tension such that a portion of a tension transmitted by the tether to the cushion in the deployed configuration is directed forward of the occupant in a horizontal direction at a height proximate a waistline of the occupant.

48. A method for restraining a cushion for an air bag system of a vehicle during deployment, the method comprising:
  providing a tether having a first end, a second end, and an intermediate portion;
  attaching the first end to the cushion;
  fixedly attaching the second end to a tether anchoring point of the vehicle;
  providing a sliding mechanism;
  providing a retractor;
  attaching the sliding mechanism to the intermediate portion in such a way that the intermediate portion is slidable in relation to the sliding mechanism; and
  attaching the retractor to the sliding mechanism.

49. A method for restraining a cushion as in claim 48, further comprising compacting the cushion by rolling.

50. A method for restraining a cushion as in claim 48, further comprising compacting the cushion by accordion folding.

51. A method for restraining a cushion as in claim 48, wherein providing a sliding mechanism comprises providing a structure selected from the group consisting of a ring encircling an intermediate portion of the rear tether, a flexible coupling loop encircling an intermediate portion of the rear tether, a roller assembly having a plurality of rollers positioned to sandwich an intermediate portion of the rear tether, and a housing having a hollow rectangular cross section sized to slidably contain a cross section of the rear tether.

52. A method for restraining a cushion as in claim 48, wherein the retractor is substantially constructed of a plastic material.

53. A method for restraining a cushion as in claim 48, wherein providing the retractor comprises providing a rotationally biased spindle that winds a flexible connector attached to the sliding mechanism.

54. A method for restraining a cushion as in claim 48, wherein attaching the second end to a tether anchoring point comprises attaching the second end proximate a roof rail of the vehicle.

55. A method for restraining a cushion as in claim 48, wherein attaching the second end to a tether anchoring point comprises attaching the second end to an abrupt rear surface of the vehicle.

56. A method for restraining a cushion as in claim 48, wherein attaching the second end to a tether anchoring point comprises attaching the second end to an attachment surface of the vehicle, wherein the attachment surface is substantially rearward of and parallel to the lateral surface.

57. A method for restraining a cushion as in claim 48, wherein attaching the retractor to the sliding mechanism comprises attaching a flexible connector to the sliding mechanism and the retractor, wherein the flexible connector is selected from the group consisting of a webbing material, a chain, a fiber-based rope, a polymer-based cord, and a metal cable.

58. A method for restraining a cushion as in claim 48, further comprising:
 providing a locking mechanism; and
 connecting the locking mechanism to the sliding mechanism to restrict withdrawal of the sliding mechanism from the retractor.

59. A method for restraining a cushion as in claim 58, wherein providing a locking mechanism comprises providing a structure selected from the group consisting of a gear rotationally coupled to the rotationally biased spindle with a blocking member that impedes rotation of the gear in a direction corresponding to withdrawal of the flexible connector from the retractor, and a rotatable engagement member that grips the flexible connector to restrain motion of the flexible connector out of the retractor.

* * * * *